United States Patent [19]

Benscoter et al.

[11] Patent Number: 4,573,297

[45] Date of Patent: Mar. 4, 1986

[54] ECONOMY POKE-THRU

[75] Inventors: Richard D. Benscoter, Vienna; Robert W. Hadfield; Timothy S. Bowman, both of Parkersburg, all of W. Va.

[73] Assignee: Butler Manufacturing Company, Kansas City, Mo.

[21] Appl. No.: 535,620

[22] Filed: Sep. 26, 1983

[51] Int. Cl.[4] .............................................. E04B 5/48
[52] U.S. Cl. .......................................... 52/221; 52/1; 174/48
[58] Field of Search .................... 52/220, 221, 232, 1; 174/47, 48, 49, 152 G

[56] References Cited

U.S. PATENT DOCUMENTS

| 3,846,604 | 11/1974 | Shallsetter | 174/48 |
| 4,091,231 | 5/1978 | Sotolongo | 174/48 |
| 4,096,964 | 6/1978 | Glick | 52/221 |
| 4,264,779 | 4/1981 | Rhodes et al. | 52/221 |
| 4,270,318 | 6/1981 | Carroll et al. | 52/221 |
| 4,272,643 | 6/1981 | Carroll et al. | 52/221 |
| 4,323,724 | 4/1982 | Shine | 174/48 |
| 4,458,460 | 7/1984 | Kohaut | 52/232 |
| 4,496,790 | 1/1985 | Spencer | 174/48 |

Primary Examiner—John E. Murtagh
Assistant Examiner—Andrew Joseph Rudy
Attorney, Agent, or Firm—Frederick J. Olsson

[57] ABSTRACT

Poke-thru has floor fitting serviced by a thru floor unit in a bore in the floor and carries power and/or communications conductors. The thru floor unit comprises a pair of mounting screws which extend down through the floor fitting base with the heads engaging the base. The mounting screws carry a flexible finger type retaining clip to grip the side of the bore. Above the retaining clip, on the mounting screws, are top separator means which maintain the clip and base a fixed distance apart. Intumescent material and a top spacer are loosely disposed in the space between the clip and the base. Below the retaining clip, on the mounting screws, is a bottom spacer. Below the bottom spacer are top and bottom retainers held a fixed distance apart by separator means. Intumescent material is loosely disposed in the space between the top and bottom retainers. The bottom retainer has nuts in which the screws are threaded.

7 Claims, 8 Drawing Figures

ECONOMY POKE-THRU

This invention relates in general to electrical underfloor systems for power and communication distribution in buildings having floors formed in whole or in part by concrete with a suspended ceiling below the floor, the space between the floor and ceiling carrying power and/or communication conductors, etc. for the system.

More specifically the invention relates to poke-thrus for use in bringing the power and/or communication conductors from space underneath the floor to the floor surface.

Poke-thrus of the kind in question normally comprise a floor fitting to be mounted on the building floor and a thru floor unit to be mounted in a bore in the floor, the floor fitting to provide power and/or communication service at a work station on the floor surface and the thru floor unit to carry power and/or communication conductors from underneath the floor to the service fitting and having fire stop means for sealing the bore against the passage of fire and smoke from the floor area below to the floor area above.

The principal objective of the invention is to promote the useful art of electrical underfloor system by means of a design providing a poke-thru which is substantially lower in cost that poke-thrus now in use thereby reducing the costs of underfloor systems for the building owners and achieving this without any sacrifice or loss of functional or structural requirements.

The invention will be described below in connection with the following drawings wherein.

Figure 2:
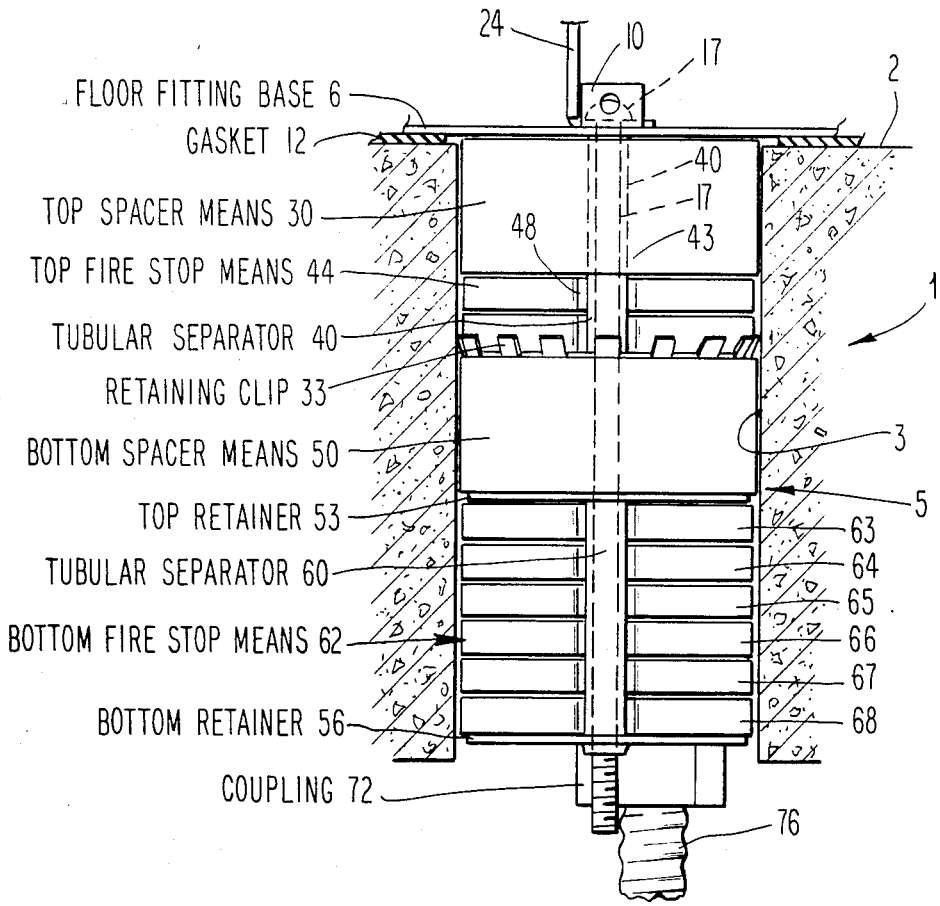
FIG. 2 is a side elevational view of the poke-thru of FIG. 1 in assembled condition with the gasket of the fitting and the floor shown in FIG. 1 with the various components assembled. This is indicated by the arrows 2—2 in FIG. 1.
Figure 3:
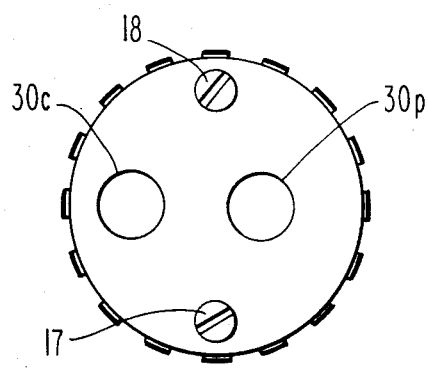
FIG. 3 is a top view of the poke-thru of FIG. 2 with the base plate and gasket removed and the floor surface not shown.
Figure 4:
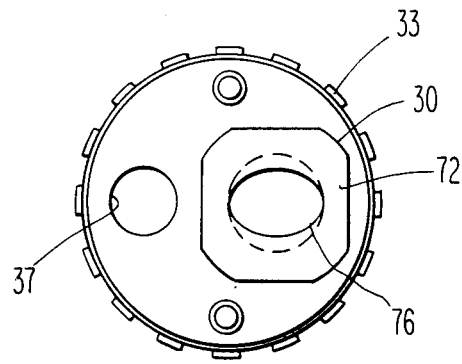
FIG. 4 is a bottom view of the poke-thru of FIG. 2 with the floor not shown.

A floor 1 with which the poke-thru is used is shown in FIG. 2, the floor surface being indicated at 2 and a bore in the floor at 3. In the description which follows, it will be understood that the various parts described are formed from metal except as specifically noted.

The poke-thru includes a floor fitting 4 (which is shown in exploded view in FIG. 5) and the thru floor unit 5 (which is shown assembled and disposed in bore 3 in FIG. 2).

Figure 5:
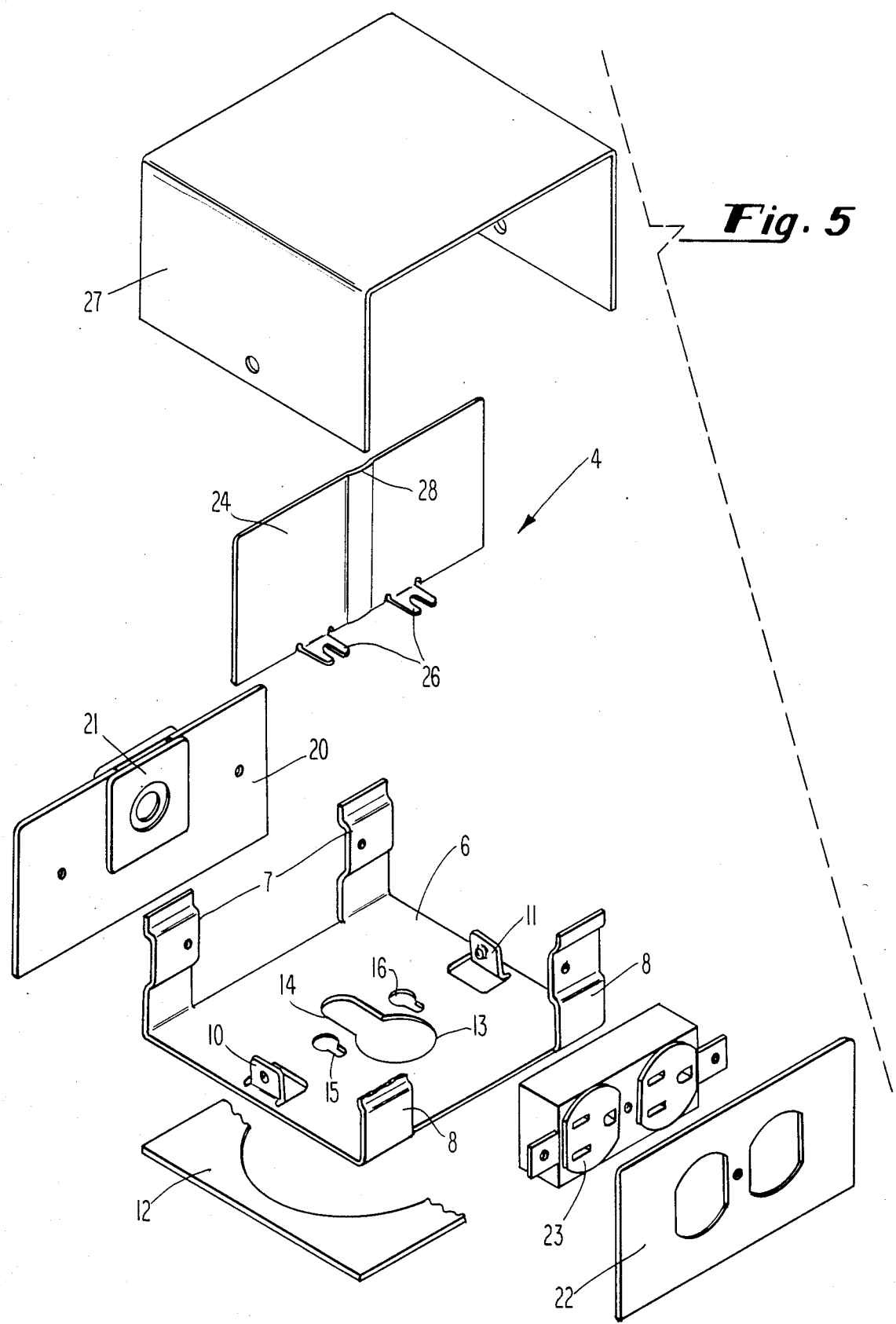
FIG. 5, is an exploded view illustrating the floor fitting of the poke-thru of FIG. 1.

The floor fitting 4 will be described in connection with FIG. 5 with portions of same being shown in FIGS. 1 and 2 as is necessary for explanatory purposes.

The fitting has flat base plate 6 and a pair of upstanding supports 7 and 8 and cover mounting tabs 10 and 11.

On the underside of the base plate is the gasket 12. The base plate also has a power opening 13 for power conductors from the thru floor unit 5 and a communication opening 14 for communication conductors from the thru floor unit 5. On opposite sides of the opening 13 and 14 are the key hole slots 15 and 16 which (see FIG. 1) are adapted to carry mounting screws 17 and 18. As noted in FIGS. 1 and 2, these screws extend down into the thru floor unit and support components of the thru floor unit as will be explained later.

The support 7 carries the telephone face plate 20 with grommet 21 and the support 8 carries the receptacle face plate 22 which mounts receptacle 23.

A partition 24 having slotted mounting feet 25 and 26 is adapted to rest on the base plate 6 up against the tabs 10 and 11 (see FIG. 2) with the slots in feet 25 and 26 over the holes 15 and 16 and to receive mounting screws 17 and 18. The heads of the screws 17 and 18 bear respectively on the feet 25 and 26. A cover 27 fits down over the supports 7 and 8 and over the tabs 10 and 11. It will be understood that appropriate apertures either with threads or arranged for self-tapping screws are provided in the foregoing parts for assembly purposes. When the parts are assembled, the partition 24 divides the fitting into a power compartment (right hand side as viewed in FIG. 5) and a communications compartment (left side).

In the partition 24, the center off-set 28 is to accomodate conductors from the communications passage 14.

In FIG. 2, we have not shown any floor covering on the surface 2. Normally such floor covering will take the form of tile or carpet. In either case, the floor covering is to be cut so that the gasket 12 rests directly on the floor covering. While the gasket 7 is not essential for poke-thru functional purposes, it is necessary for the U/L scrub tests.

The thru floor unit 3 will next be described.

The thru floor unit has a top spacer means 30 which is in the form of a cylindrically-shaped disc. The spacer has a pair of clearance apertures 31 and 32 which will be commented on shortly.

Below the top spacer means 30 is a cylindrically shaped retaining clip 33 which has a seat section 34 and a plurality of fingers 35 spaced around the periphery.

The seat section 34 has a pair of clearance apertures 36 and 37 which are respectively adapted to receive the mounting screws 17 and 18 and mount the clip on the same.

The material for the clip is stainless steel half-hard. This provides for the finger 35 to be flexible. When the thru floor unit 3 is in the floor bore (FIG. 2) the fingers flex and tightly engage the bore to hold the thru floor unit in position.

Between the base plate 6 and the retaining clip 33 are a pair of tubular separators 40 and 41 respectively mounted on the screws 17 and 18. The separators are received by the apertures 31 and 32 in the top spacer means 30. As best seen in FIG. 2, the lower ends of the separators 40 and 41 tightly engage the top of the seat section 34 of the retaining clip 33 and the upper ends tightly engage the underside of the base plate 6. The separators function to separate the base plate 6 and retaining clip 33 and maintain the same a fixed distance apart.

In the space between the base plate 6 and retaining clip 33, below the top spacer means 30 and above retaining clip 33, is located top fire stop means 44 which is in the form of cylindrically-shaped wafers 45 and 46. The wafers have clearance slots which receive the separators 40 and 41. See the clearance slots 47 and 48 for wafer 45. The wafer 46 has similar slots. The wafers are made of intumescent material.

The combined thickness of the wafers 45 and 46 and top spacer 30 is less than the distance between the base plate 6 and the retaining clip 33. The clearance slots in the wafers are each of greater width than the tubular separators. With the foregoing dimensions, neither the fire stop means 44 nor the top spacer 30 function as a structural component of the thru floor unit since they are not squeezed or compressed between and, therefore do not transfer load between the base plate 6 and retaining clip 33. The top fire stop means 44 is retained in position by virtue of the tubular separators in the clearance slots 47 and 48, etc.

Below the retaining clip 33 is a bottom spacer means 50 in the form of a cylindrically-shaped disc. The spacer means has a pair of clearance apertures 51 and 52 which are respectively adapted to receive the screws 17 and 18 and mount the bottom spacer means on the same. The top side of the bottom spacer means 50 is in tight engagement with the underside of the seat section 34 of the clip 33.

Underneath the bottom spacer means 50 is a cylindrically-shaped top retainer 53 having clearance holes 54 and 55 which receive the mounting screws 17 and 18 and mount the top retainer on the same. The top side of the top retainer 53 is in tight engagement with the underside of the bottom spacer means 50.

Below the top retainer 53 is the bottom retainer 56 having threaded apertures 57 and 58 which function as nuts for the mounting screws 17 and 18.

Between the top retainer 53 and bottom retainer 56 are a pair of tubular separators 60 and 61 respectively mounted on the mounting screws 17 and 18. The lower ends of the separators 60 and 61 tightly engage the top side of bottom retainer 56 and the top ends tightly engage the underside of top retainer 53. The separators 60 and 61 function to separate the top and bottom retainers and maintain the same a fixed distance apart.

In the space between the top and bottom retainers 53 and 56 is located bottom fire stop means 62 in the form of cylindrically-shaped wafers 63, 64, 65, 66, 67, and 68 as noted in FIG. 2. In FIG. 1 (for illustration purposes) only wafers 63 and 68 are shown. The wafers have clearance slots which receive the separators 60 and 61. See the clearance slots 70 and 71 for wafer 63. The other wafers have similar slots.

The combined thickness of the wafers 64–68 is less than the distance between the top and bottom retainers. The clearance slots in the wafers are each of greater width than a tubular separator. With such smaller dimensions, the bottom fire stop means 62 does not function as a structural component of the thru floor unit since it is not squeezed or compressed between and, therefore, cannot transfer load between the top and bottom retainers. The bottom fire stop means 62 is retained in position by the tubular separators 60 and 61 in the clearance slots 70 and 71. The top spacer means 30, the wafers 45 and 46, the retaining clip 30, the bottom spacer means 50, the top retainer 53, the wafers 64–68, and the bottom retainer 56 each have a pair of openings, one of the openings being aligned with the power opening 13 and the other opening with the communications opening 14. In FIG. 1 each opening is aligned with the power opening 13 being designated by the letter "p" in association with number of the component and the opening aligned with communications opening 14 being designated by the letter "c" in association with the number of the component.

The respective opening aligned with the power opening 13 provides a passageway for power conductor from underneath the floor to the service fitting. The respective opening aligned with the communication opening 14 provides a passageway for communication conductor from underneath the floor to the service fitting.

It will be observed that the various clearance apertures (such as the apertures 31 and 32 of top spacer 30) receiving the separators 40 and 41 provide a means for aligning the openings with respect to the power and communication openings 13 and 14. Likewise, it will be noted that the clearance slots in the various wafers also serve to align the wafers with respect to the openings 13 and 14.

The several tight engagements mentioned above are effected by turning down the screws 17 and 18 in the nuts 57 and 58. This tight condition is particularly desirable as the thru floor unit is disposed in the bore 3. In connection with the foregoing, it is useful at this point to comment on the installation of the poke-thru.

Normally, both the floor fitting and thru floor unit are supplied as independent, assembled items. In the thru floor unit, the screws 17 and 18 are tightened up (with heads on the top side of spacer 30) as needed. The gasket 12 is also supplied as an independent unit and has a pressure sensitive adhesive on one side covered by a protective paper which can be peeled off so the gasket can be applied to the base plate 6 as desired.

After the bore 3 has been drilled in the floor, the thru floor unit is inserted part way down in the bore, the floor fitting disassembled, and the gasket applied to the base. The screws 17 and 18 are then backed off so that the heads are spaced away from the top spacer means 30. The base plate 6 is mounted on the spacer 30 by placing the heads of the screws thru the keyhole slots 15 and 16. Next, partition 24 is mounted by placing the slotted mounting feet 25 and 26 underneath the heads of screws 17 and 18.

The screws 17 and 18 are then turned until the feet 25 and 26 are firm on the base plate 6, the base plate 6 firm on the top spacer 30, and the various components of the thru floor unit in tight engagement.

At that point, the base 6 can be pushed down against the floor so that the thru floor unit is fully in the bore. The poke-thru is now ready for wiring.

With respect to wiring for communications such as telephone, a telephone cable from the space below the floor (where it is connected to a distribution box) is pushed up through the communication passageway in the thru floor unit, out through the communication opening 14, through the grommet 21 in the plate 20 (previously secured to supports 20), and the various pairs in cable are connected to an Amphenol connector.

As to power wiring, the power conductors are normally disposed in flexible conduit. Thus, coupling means is provided to connect the lower end of the thru floor unit with the flexible conduit.

Such coupling means is indicated at 72 and preferably comprises a coupler manufactured by AMP Inc., Harrisburg, Pa. as noted in Product Bulletin 1203-4. This coupler has a head 73 which fits inside the part which it is used and snap fingers on the head lock the same in position. For purposes of accepting the head, the bottom retainer 56 and the wafer 68 are respectively provided with large apertures 74 and 75.

Prior to the coupler being connected to the bottom retainer, the flexible conduit 76 (FIG. 1) is cut to leave sufficient length for each conductor to extend up through and out of the power passageway in the thru floor unit so the same can be wired to a receptacle.

The wiring of the receptacle, its mounting on support 8, and the attachment of plate 22 and cover 27 readies the poke-thru for use.

Figure 1:
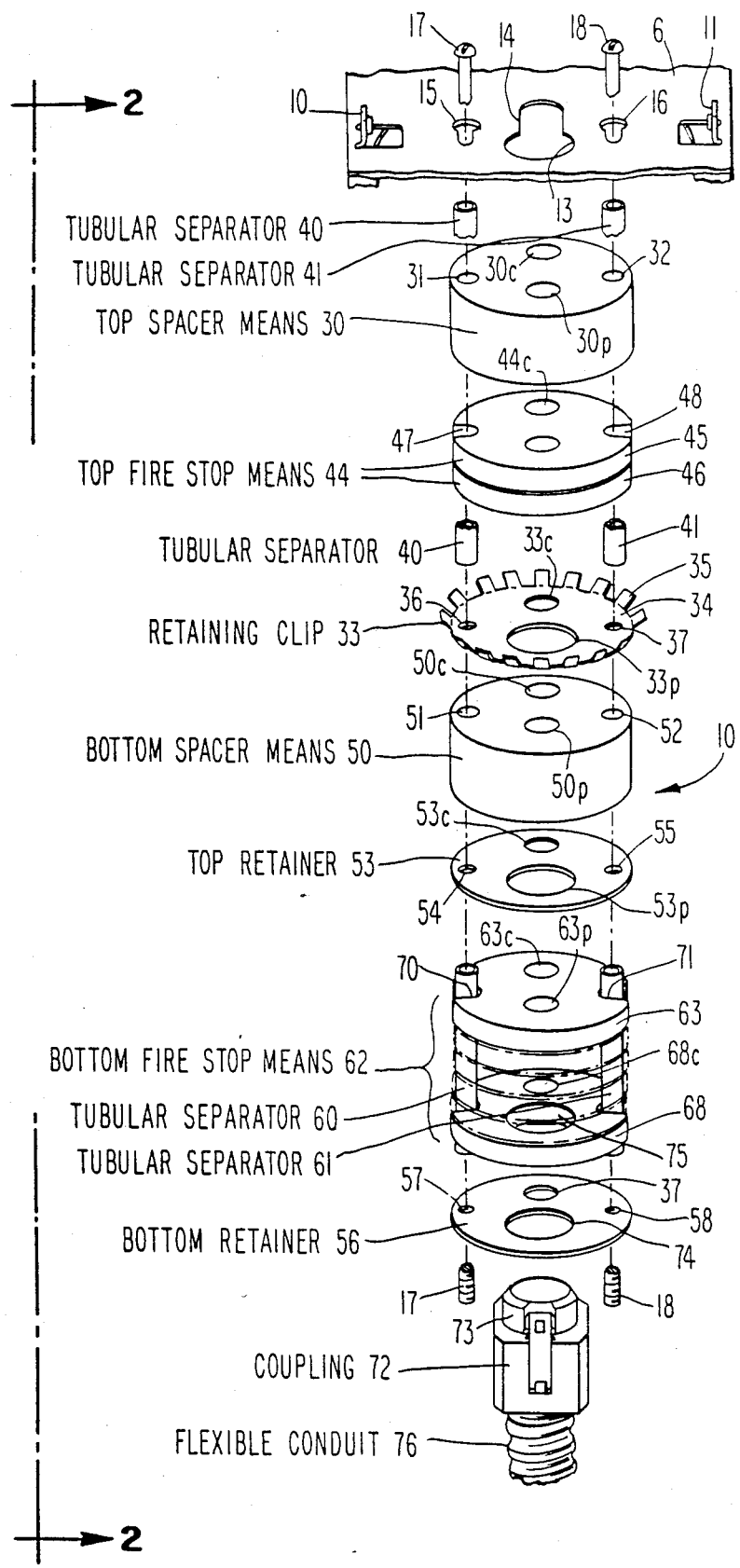
FIG. 1 is an exploded view illustrating a typical poke-thru constructed in accordance with the invention with only portions of the floor fitting illustrated.
Figure 6:
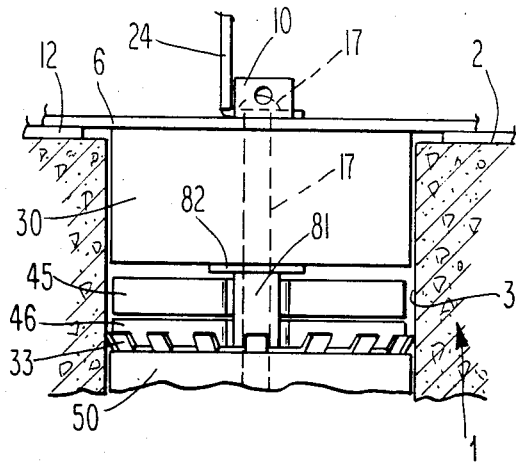
FIG. 6 is a fragmentary elevational view illustrating a modification of the poke-thru of FIG. 1.

In FIG. 6 we have shown a further modified version of the poke-thru of FIG. 1. The prime objective of this design is to lower costs. The parts in FIG. 6 which correspond to the parts in FIGS. 1 and 2 are identified by the same numbers.

In the embodiment of FIG. 6 the tubular separators 40 and 41 have been replaced by flanged separators. See separator 81 having flange 82 which replaced separator 40. A similar flanged separator replaces the separator 41. The bottom ends of the separators tightly engage the top side of the section 34. These flanges are dimensioned to hold the top side of the top spacer means 30 tightly against the underside of the base plate 6 and maintain a fixed distance between top spacer 30 and retaining clip 33. As in the embodiment of FIG. 1, the fire stop means 44 does not function as a structural component.

Figure 7:
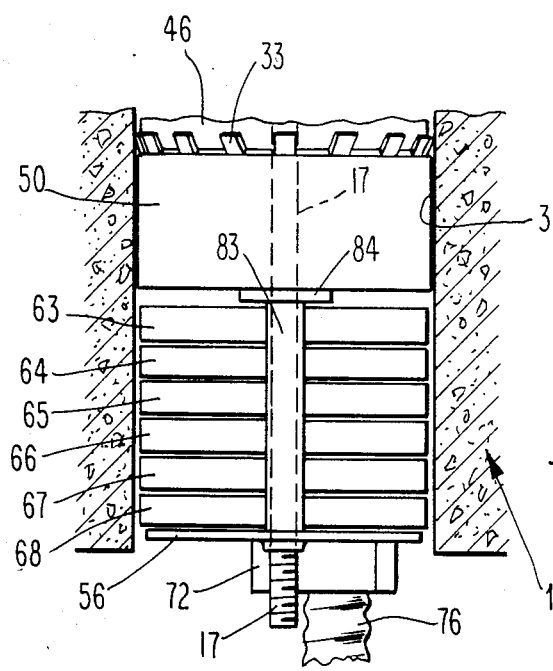
FIG. 7 is an elevational view illustrating a still further modification of the poke-thru of FIG. 1.

In FIG. 7 we have shown a modified version of the poke-thru of FIG. 1. The object of this design is to reduce the total mass of metal in the poke-thru to aid in reducing heat transfer and to lower costs. The parts in FIG. 7 which correspond to the parts in FIGS. 1 and 2 are identified by the same numbers.

In the embodiment of FIG. 7 the top retainer 53 has been omitted and the separators 60 and 61 replaced by flanged separators. See separator 83 having flange 84 which replaced separator 60. A similar flanged separator replaced separator 61. The flanges of the separators are tightly engaged with the bottom spacer means 50 and the bottom ends of the separators tightly engage the bottom retainer 56. Thus, the bottom spacer means 50 and the bottom retainer are separated and maintained a fixed distance apart. As in the embodiment of FIG. 1, the fire stop means 62 is not a structural component of the thru floor unit.

Figure 8:
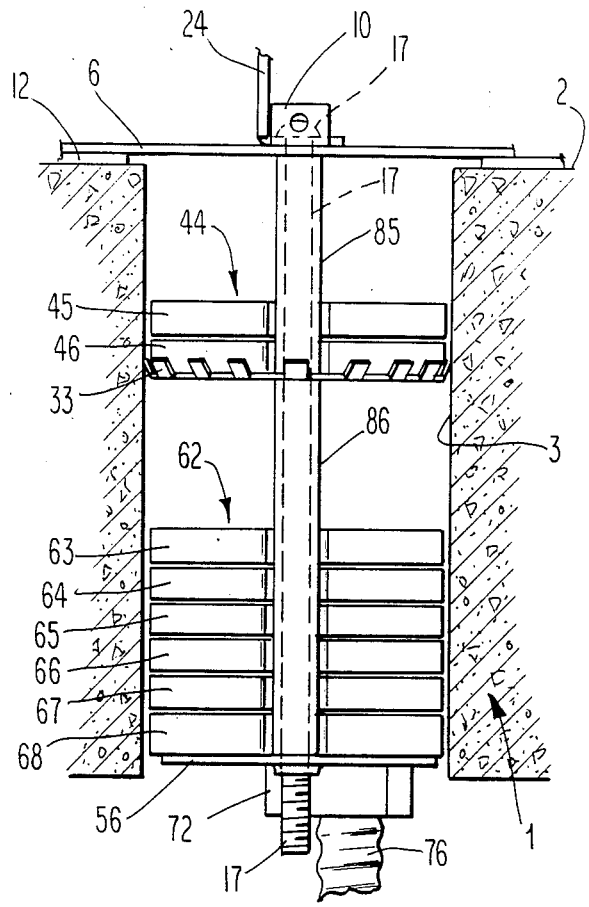
FIG. 8 is an elevational view of another modification of the poke-thru of FIG. 1.

In FIG. 8 we have illustrated a further modification of the design of FIG. 1. The objective of the design is to lower costs by eliminating the top retainer 53 and the spacer means 30 and 50. In FIG. 8 the parts which correspond to the parts in FIGS. 1 and 2 are identified by the same numbers.

The top tubular separators of FIG. 1 have been replaced by elongated tubular separators. See separator 85 which replaced separator 40. The top of each separator engages the underside base plate 6 and the bottom of each separator engages the top side of seat section 34 of retaining clip 33 and separates and maintains the base plate and retaining clip a fixed distance apart. The spacing is greater than the thickness of the wafers 45 and 46 so that the wafers do not function as structural components. Also, see separator 86 which replaced separator 60. The top of each of these separators engages the underside of seat section 34 and the bottom of each engages the top side of the bottom retainer 56 to separate and maintain the retaining clip and bottom retainer a fixed distance apart. The spacing between the clip and retainer is greater than the thickness of the wafers 63–68 so as in the embodiment of FIG. 1. The wafers do not serve as structural components.

We will now comment on the material for the fire stop means 44 and 62 and the spacer means 30 and 52.

The fire stop means is made of intumescent material, preferably FS-195 manufactured by the 3M Company of St. Paul Minnesota. This material can be supplied in sheets which are punched out to form the wafer configuration as above described.

The spacer material is EPDM (55–60 Durometer) manufactured by Syntex Rubber Corporation, Bridgeport, Conn. The material does not support combustion, has a temperature range in the order of 300° F. to 400° F. and to some extend functions as an insulator. The spacer material is somewhat flexible and this characteristic is brought in to use as will be noted later.

In conclusion, we will comment on the preferred dimensions of the above described components of the thru floor unit. It will be understood that the dimensions are given by way of example and may vary with different floor thickness and different sized bores. First of all, the outside diameter of the thru floor unit is about 2" so as to fit into a 2" bore in the floor. The length of the thru floor unit will vary according to the thickness of the floor with which it is used. For a 3½" or greater floor the unit is 4¾" in length and for a 2½-3¼" floor the unit is 4" in length.

The difference in length of the thru floor unit is obtained by the use of longer mounting screws. Also, there is an additional disc forming the top spacer means 30. These spacers are ⅞" thick and one is used for a 2½-3¼" floor and two are used for a 3½" or greater floor. The spacers are formed with a 2" outside diameter and when the screws 17 and 18 are tightened by a final assembly, the pressure on the bottom spacer means 50 between the retaining clip 33 and the top retainer 53 will normally be sufficient to cause the bottom spacer 50 to expand slightly radially and more tightly engage the wall of the bore.

The top and the bottom retainers 53 and 56 are made from 14 guage galvanized steel and have an outside diameter of 1⅞". In the retaining clip 33 the seat 34 has an outside diameter of 1⅞" and the outer locus of the fingers 35 (of which there are 16) has an outside diameter of 2⅛" and the fingers are oriented 45° to the seat section.

The various intumescent wafers are 7/32" minimum and ¼" maximum thickness and have an outside diameter of 1 15/16".

We claim:

1. An improved poke-thru assembly having: a service fitting to be mounted on a building floor and a thru floor unit to be mounted in a bore in the building floor, the floor fitting to provide power and/or communication service at a work station on the floor surface and the thru floor unit to carry power and/or communication conductors from underneath the floor to the service fitting and having fire stop means for sealing the bore against passage of fire and smoke, the assembly comprising:

said service fitting including:
a flat base plate, having a top side and underside, a power opening for power conductors, a communications opening for communication conductors; a a pair of screw receiving apertures; and a gasket on the bottom of the base plate;

said thru floor unit including:

a pair of elongated mounting screws respectively disposed in said screw receiving apertures, the heads of which tightly engage said base plate;

a first pair of tubular separators respectively mounted on said mounting screws, one end of each being tightly engaged with said base plate;

a cylindrically-shaped retaining clip made of resilient material and having a seat section and a plurality of fingers around the periphery thereof, the seat section being formed to provide clearance means receiving said mounting screws and the fingers being for use in engaging the side of said bore to retain the thru floor unit therein;

each opposite end of said tubular separators being in tight engagement with said seat section;

said tubular separators separating and maintaining said base plate and said retaining clip a fixed distance apart;

top spacer means disposed in the space between said base plate and said clip and being formed to provide clearance means receiving said first pair of tubular separators;

top fire stop means made of intumescent material and disposed in the space between said base plate and said clip and being formed to provide clearance means receiving said first pair of tubular separators;

the combined thickness of said top spacer means and said top fire stop means in a direction between said base plate and said seat section being less than the distance between the base plate and the seat section whereby neither the top spacer means nor the top fire stop means functions as a structural component of the thru floor unit;

bottom spacer means being formed to provide clearance means receiving said mounting screws, the bottom spacer means being in tight engagement with said seat section;

a cylindrically-shaped top retainer being formed to provide clearance means receiving said mounting screws, the top retainer being in tight engagement with said bottom spacer means;

a cylindrically-shaped bottom retainer having a pair of threaded apertures each comprising a nut respectively receiving the threaded portions of said mounting screws and mounting the bottom retainer thereon;

a second pair of tubular spacers respectively mounted on said mounting screws, one end of each being in tight engagement with said top retainer and each opposite end being in tight engagement with said bottom retainer, the second separators separating and maintaining the top and bottom retainers a fixed distance apart;

bottom fire stop means made of intumescent material disposed in the space between said top and said bottom retainers and being formed to provide clearance means receiving said second pair of tubular separators and the thickness of the bottom fire stop means in a direction between the top and bottom retainers being less than the distance between the top and bottom retainers whereby the bottom fire stop means does not function as a structural component of the thru floor unit;

said mounting screws being turned in said nuts to cause said plurality of tight engagements; and said top spacer means, said top fire stop means, said retaining clip, said bottom spacer means, said top retainer, said bottom fire stop means, and said bottom retainer, each respectively having a pair of openings, one opening aligned with said power opening in said base plate and the other opening aligned with said communication opening in said base plate, the respective aligned openings providing a passageway for power conductors from underneath the floor to said service fitting and a passageway for communication conductors from underneath the floor to said service fitting.

2. The poke-thru of claim 1 wherein the top fire stop means is in the form of a plurality of cylindrically-shaped wafers and the bottom fire stop means is in the form of a plurality of cylindrically-shaped wafers.

3. An improved poke-thru assembly having: a service fitting to be mounted on a building floor and a thru floor unit to be mounted in a bore in the building floor, the floor fitting to provide power and/or communication service at a work station on the floor surface and the thru floor unit to carry power and/or communication conductors from underneath the floor to the service fitting and having fire stop means for sealing the bore against passage of fire and smoke, the assembly comprising:

said service fitting including:
  a flat base plate, having a top side and underside, a power opening for power conductors, a communications opening for communication conductors; a pair of screw receiving apertures; and a gasket on the bottom of the base plate;

said thru floor unit including:
  a pair of elongated mounting screws respectively disposed in said screw receiving apertures, the heads of which tightly engage said base plate;
  top spacer means being formed to provide clearance means receiving said mounting screws, the top spacer means being in tight engagement with said base plate;
  a cylindrically-shaped retaining clip made of resilient material and having a seat section and a plurality of fingers around the periphery thereof and being formed to provide clearance means receiving said mounting screws and the fingers being for use in engaging the side of said bore to retain the thru floor unit therein;
  a first pair of tubular separators respectively mounted on said mounting screws one end of each being tightly engaged with said seat section and the opposite end of each having a flange in tight engagement with said top spacer, the saparators separating and maintaining the seat section and the top spacer a fixed distance apart;
  top fire stop means made of intumescent material and disposed between said top spacer means and said seat section and being formed to provide clearance means receiving said first pair of tubular separators, the thickness of the top fire stop means in a direction between the top spacer means and the seat section being less than the distance between the top spacer means and the seat section whereby the top fire stop means does not function as a structural component of the thru floor unit;
  bottom spacer means being formed to provide clearance means receiving said mounting screws, the bottom spacer means being in tight engagement with said seat section;

a cylindrically-shaped top retainer being formed to provide clearance means receiving said mounting screws, the top retainer being in tight engagement with said bottom spacer means;

a second pair of tubular separators respectively mounted on said mounting screws, one end of each being tightly engaged with said top retainer and each opposite end being in tight engagement with said bottom retainer, the second separators separating and maintaining the top and bottom retainers a fixed distance apart;

bottom fire stop means made of intumescent material disposed in the space between said top and bottom retainers, the thickness of the bottom fire stop means in a direction between the top and bottom retainers being less than the distance between the top and bottom retainers whereby the bottom fire stop means does not function as a structural component of the thru floor unit;

said mounting screws being turned in said nuts to cause said plurality of tight engagements; and said top spacer means, said top fire stop means, said retaining clip, said bottom spacer means, said bottom fire stop means, said top retainer, and said bottom retainer each respectively having a pair of openings, one opening aligned with said power opening in said base plate and the other opening aligned with said communications opening in said base plate, the respective aligned openings providing a passageway for power conductors frum underneath the floor to said service fitting and a passageway for communication conductors from underneath the floor to said service fitting.

4. An improved poke-thru assembly having: a service fitting to be mounted on a building floor and a thru floor unit to be mounted in a bore in the building floor, the floor fitting to provide power and/or communication service at a work station on the floor surface and the thru floor unit to carry power and/or communication conductors from underneath the floor to the service fitting and having fire stop means for sealing the bore against passage of fire and smoke, the assembly comprising:

said service fitting including:

a flat base plate, having a top side and underside, power opening for power conductors, a communications opening for communication conductors; a pair of screw receiving apertures; and a gasket on the bottom of the base plate;

said thru floor unit including:

a pair of elongated mounting screws respectively disposed in said screw receiving apertures, the heads of which tightly engage said base plate;

a first pair of tubular separators respectively mounted on said mounting screws, one end of each being tightly engaged with said base plate;

a cylindrically-shaped retaining clip made of resilient material and having a seat section and a plurality of fingers around the periphery thereof, the seat section being formed to provide clearance means receiving said mounting screws and the fingers being for use in engaging the side of said bore to retain the thru floor unit therein;

each opposite end of said tubular separators being in tight engagement with said seat section;

said tubular separators separating and maintaining said base plate and said retaining clip a fixed distance apart;

top spacer means disposed in the space between said base plate and said clip and being formed to provide clearance means receiving said first pair of tubular separators;

top fire stop means made of intumescent material and disposed in the space between said base plate and said clip and being formed to provide clearance means receiving said first pair of tubular separators;

the combined thickness of said top spacer means and said top fire stop means in a direction between said base plate and said seat section being less than the distance between the base plate and the seat section whereby neither the top spacer means nor the top fire stop means functions as a structural component of the thru floor unit;

bottom spacer means being formed to provide clearance means receiving said mounting screws, the bottom spacer means being in tight engagement with said seat section;

a cylindrically-shaped bottom retainer having a pair of threaded apertures each comprising a nut respectively receiving the threaded portions of said mounting screws and mounting the bottom retainer thereon;

a second pair of tubular separators respectively mounted on said mounting screws, one end of each being tightly engaged with said bottom retainer and each opposite end having a flange in tight engagement with said bottom spacer means, the second separators separating and maintaining the bottom spacer and the bottom retainer a fixed distance apart;

bottom fire stop means made of intumescent material and disposed in the space between said bottom spacer means and said bottom retainer and being formed to provide clearance means receiving said second pair of tubular separators, the thickness of the bottom fire stop wafer means in a direction between the bottom spacer means and the bottom retainer being less than the distance between the bottom spacer means and the bottom retainer whereby the bottom fire stop wafer means does not function as a structural component of the thru floor unit;

said mounting screws being turned in said nuts to cause said plurality of tight engagements; and said top spacer means, said top fire stop wafer means, said retainer clip, said bottom spacer means, said bottom fire stop wafer means, and said bottom retainer each respectively having a pair of openings, one opening aligned with said power opening in said base plate and the other opening aligned with said communications opening in said base plate, the respective aligned openings providing a passageway for power conductors from underneath the floor to said service fitting and a passageway for communication conductors from underneath the floor to said service fitting.

5. An improved poke-thru assembly having: a service fitting to be mounted on a building floor and a thru floor unit to be mounted in a bore in the building floor, the floor fitting to provide power and/or communication service at a work station on the floor surface and the thru floor unit to carry power and/or communication conductors from underneath the floor to the service fitting and having fire-stop means for sealing the bore against passage of fire and smoke, the assembly comprising:

said service fitting including:

a flat base plate, having a top side and underside, a power opening for power conductors, a communications opening for communication conductors; a pair of screw receiving apertures; and a gasket on the bottom;

said thru floor unit including:

a pair of elongated mounting screws respectively disposed in said screw receiving apertures, the heads of which tightly engage said base plate;

a cylindrically-shaped retaining clip made of resilient material and having a seat section and a plurality of fingers around the periphery thereof, the seat section having a pair of clearance apertures receiving and mounting the retaining clip on said mounting screws and the fingers being for use in engaging the side of said bore to retain the thru floor unit therein;

top spacer means in the form of a pair of tubular separators respectively mounted on said screws one end of each being tightly engaged with said seat section and the opposite end of each being in tight engagement with said base plate, the separators separating and maintaining the seat section and base plate a fixed distance apart;

top fire stop means made of intumescent material and disposed in the space between said seat section and said base plate the thickness of the top fire stop means in a direction between said seat section and said base plate being less than the distance between the seat section and the base plate whereby the top fire stop means does not function as a structural component of the thru floor unit;

a cylindrically-shaped bottom retainer having a pair of threaded apertures each comprising a nut respectively receiving the threaded portion of said screws and mounting the bottom retainer thereon;

bottom spacer means in the form of a pair of tubular separators respectively mounted on said screws, one end of each being tightly engaged with said bottom retainer and each opposite end being in tight engagement with said retainer clip, the second separators separating and maintaining the bottom retainer and retaining clip a fixed distance apart;

bottom fire stop means made of intumescent material disposed in the space between said bottom retainer and said retaining clip, the thickness of the bottom fire stop means in a direction between the bottom retainer and the retaining clip being less than the distance between the bottom retainer and the retaining clip whereby the bottom fire stop means does not function as a structural component of the thru floor unit;

said screws being turned into said nuts to cause said plurality of tight engagements; and said top fire stop means, said retaining slip, said bottom fire stop means, and said bottom retainer each respectively having a pair of openings, one opening aligned with said power opening in said base plate and the other opening aligned with said communication opening in said base plate, the respective aligned openings providing a passageway for power conductors from underneath the floor to said service fitting.

6. The poke-thru of claims 1, 2, 3, 4, or 5 further including coupling means connected with said bottom retainer in alignment with the power passageway for connecting power conduit means and wherein a portion of said fire-stop means adjacent said bottom retainer has an enlarged section to accomodate a portion of said coupling means.

7. The poke-thru of claims 1, 2, 3, 4, 5, or 6 wherein said floor fitting further includes:

a divider extending outwardly from said base to divide the fitting into a power section open to said power passageway and a communication section open to said communication passageway; and a pair of feet on said divider engaging said base and each having a slot respectively engaging and receiving said screws whereby the heads of the screws engage the feet and hold same on said base.

* * * * *